United States Patent
Lei et al.

(10) Patent No.: US 10,547,730 B2
(45) Date of Patent: Jan. 28, 2020

(54) METHOD AND APPARATUS FOR VEHICULAR EMERGENCY CALL

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 431 days.

(21) Appl. No.: 14/937,934

(22) Filed: Nov. 11, 2015

(65) Prior Publication Data

US 2017/0135136 A1    May 11, 2017

(51) Int. Cl.
*H04M 11/04* (2006.01)
*H04M 1/725* (2006.01)
*H04M 3/51* (2006.01)

(52) U.S. Cl.
CPC ..... *H04M 1/7253* (2013.01); *H04M 1/72569* (2013.01); *H04M 3/5116* (2013.01)

(58) Field of Classification Search
CPC ... H04W 76/007; H04W 4/22; H04W 76/025; H04W 76/064; H04W 4/02; H04W 64/00; H04M 1/7253; H04M 1/72569; H04M 3/5116; H04M 11/04; H04M 2242/04; G08B 25/016
USPC .......................................... 455/404.1, 404.2
See application file for complete search history.

(56) References Cited

U.S. PATENT DOCUMENTS

| | | | |
|---|---|---|---|
| 2002/0106059 A1* | 8/2002 | Kroll | H04M 11/04 379/45 |
| 2003/0194078 A1* | 10/2003 | Wood | H04M 3/42153 379/224 |
| 2012/0220258 A1* | 8/2012 | Hatton | G08G 1/205 455/404.2 |
| 2012/0289185 A1* | 11/2012 | Leung | H04W 76/007 455/404.2 |
| 2013/0109404 A1* | 5/2013 | Husney | H04W 4/02 455/456.1 |
| 2013/0130639 A1 | 5/2013 | Oesterling et al. | |
| 2013/0226369 A1 | 8/2013 | Yorio et al. | |
| 2014/0087680 A1 | 3/2014 | Luukkala et al. | |
| 2014/0273915 A1* | 9/2014 | Corley | H04W 4/90 455/404.1 |
| 2015/0111517 A1* | 4/2015 | Kowalewski | H04W 4/22 455/404.1 |
| 2015/0342542 A1* | 12/2015 | An | A61B 5/747 455/404.2 |
| 2015/0348337 A1* | 12/2015 | Choi | G07C 5/08 701/31.5 |
| 2016/0007384 A1* | 1/2016 | Dettloff | H04W 76/007 455/404.1 |
| 2016/0029197 A1* | 1/2016 | Gellens | G05D 1/0011 455/404.1 |

(Continued)

*Primary Examiner* — Khoi H Tran
*Assistant Examiner* — B M M Hannan
(74) *Attorney, Agent, or Firm* — Michael Spenner; Brooks Kushman P.C.

(57) ABSTRACT

A system includes a plurality of processors configured to utilize a plurality of vehicle connectivity options, each option in communication with one of the plurality of processors, to place a plurality of calls to emergency services using the plurality of vehicle connectivity options in response to detection of a vehicle accident.

9 Claims, 3 Drawing Sheets

(56) References Cited

U.S. PATENT DOCUMENTS

2016/0087655 A1* 3/2016 Kim .................. H04W 4/90
455/404.1

* cited by examiner

METHOD AND APPARATUS FOR VEHICULAR EMERGENCY CALL

TECHNICAL FIELD

The illustrative embodiments generally relate to a method and apparatus for vehicular emergency call redundancy.

BACKGROUND

Vehicular safety systems have evolved and improved a great deal with the advent and inclusion of connected services within the vehicle environment. Vehicle telematics systems and infotainment systems that can communicate with the cloud provide opportunities to, for example, contact emergency services in the event of a vehicle accident.

Some vehicular systems utilize an embedded vehicle modem to call an intermediary or an emergency operator in the event of an accident. In other strategies, a vehicle computing system connects to an occupant phone and uses the occupant phone to place a call to the intermediary or emergency operator.

SUMMARY

In a first illustrative embodiment, a system includes a plurality of processors configured to utilize a plurality of vehicle connectivity options, each option in communication with one of the plurality of processors, to initiate at least two calls to emergency services in response to detection of a vehicle accident.

In a second illustrative embodiment, a computer-implemented method includes detecting a vehicle accident. The method also includes initiating first and second emergency calls concurrently using first and second vehicular communication options, respectively, in response to detecting the accident.

In a third illustrative embodiment, a non-transitory computer readable storage medium stores instructions that, when executed by a processor, cause the processor to perform a method including detecting a vehicle accident. The method also includes placing a first emergency call using a first vehicular communication option upon detecting the accident and placing a second, simultaneous emergency call using a second vehicular communication option upon detecting the accident.

DETAILED DESCRIPTION

As required, detailed embodiments are disclosed herein; however, it is to be understood that the disclosed embodiments are merely examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Figure 1:
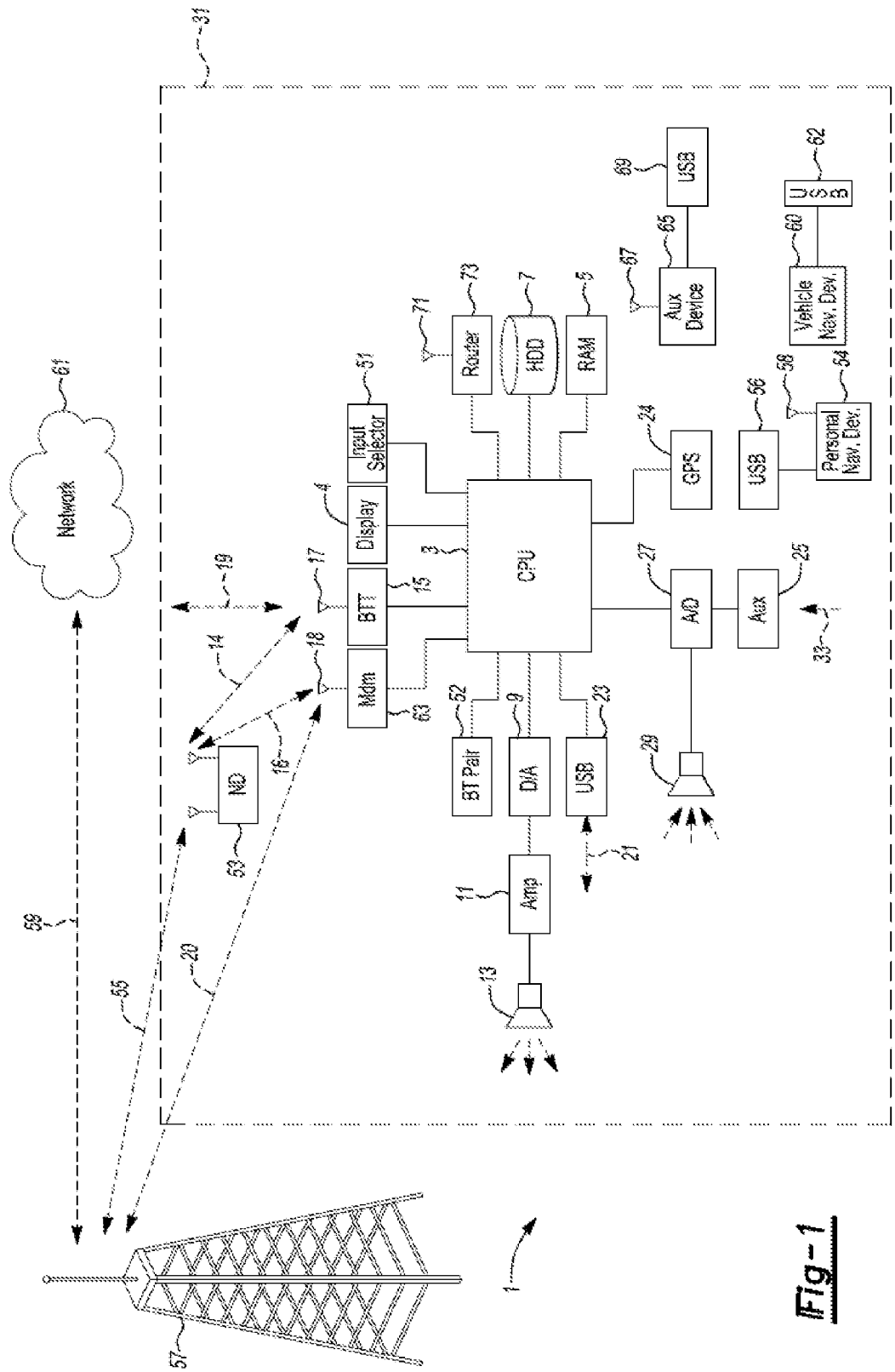
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data- plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In current emergency reporting systems, accident related sensors trigger calls to emergency services using either an embedded vehicle modem or a cellular phone paired with a vehicle computing system. If a modem is damaged, and the system relies on the modem to place a call, or if a phone is damaged, and the system relies on the phone to place a call, then the process may fail to complete the call and no emergency help may be obtained. In the illustrative embodiments, the process utilizes both a vehicle modem and the paired phone to place redundant, concurrent calls, and if both connect then the emergency operator can disconnect a redundant call. If either device connects first, the vehicle computer can cancel the other call.

Figure 2:
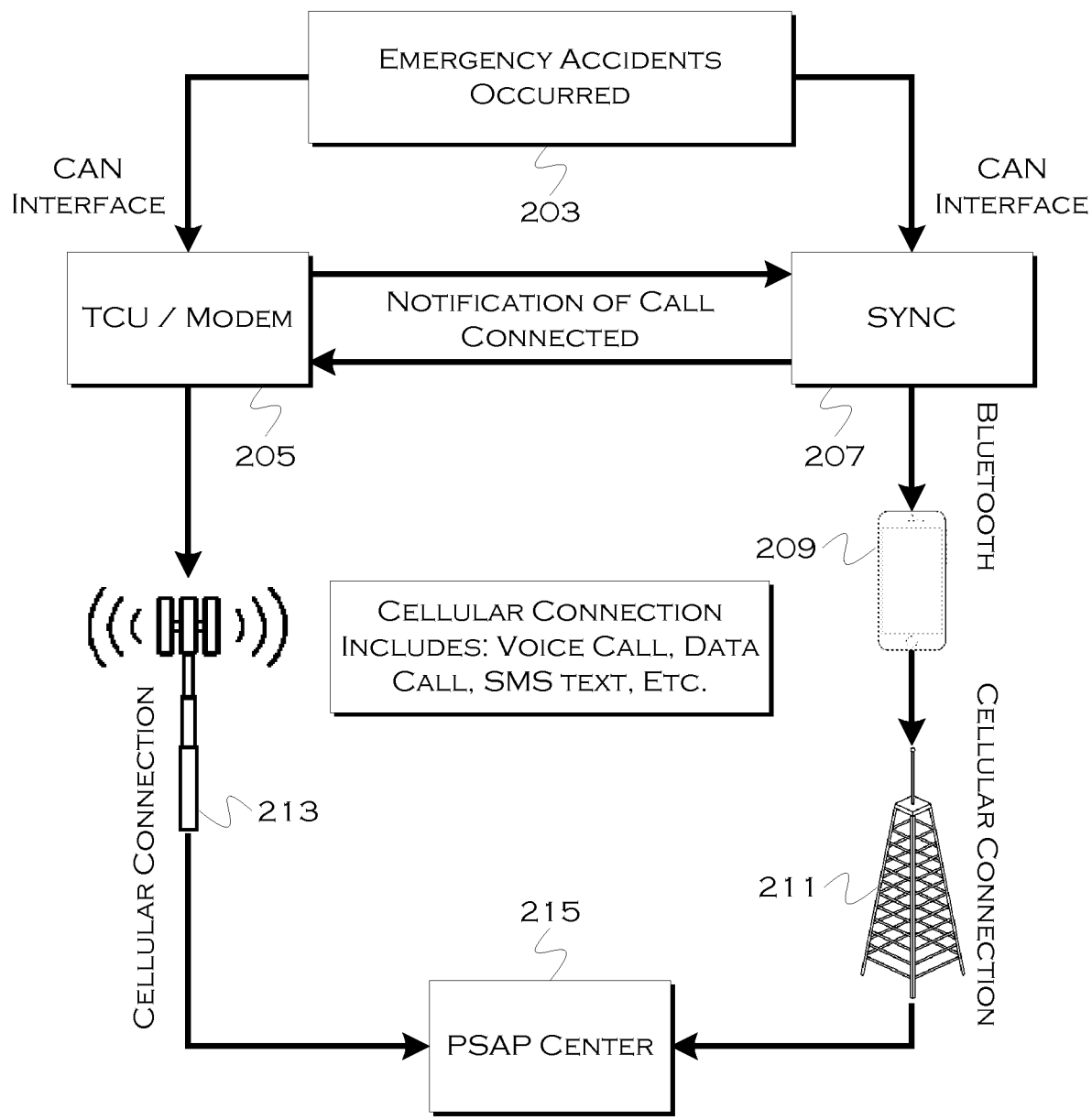
FIG. 2 shows an illustrative system for practicing the illustrative embodiments.

FIG. 2 shows an illustrative system for practicing the illustrative embodiments. In this illustrative system, the process detects an accident through one or more vehicle sensors 203. These sensors send relevant information relating to the accident over the vehicle controller area network (CAN) bus(ses). This can include, but is not limited to, impact sensor data, airbag sensor data, vehicle speed at the time of the accident, vehicle rollover sensor data, passenger restraint data, etc.

This data is passed from the CAN bus to a vehicle telematics control unit (TCU) provided with a modem 205. This unit can place a call in the absence of an operator cellular phone, or if an operator cellular phone is damaged. The data is also passed to an infotainment system 207, which can utilize a paired cellular phone to place an external call, and can operate in the absence of a vehicle modem or if a vehicle modem is damaged. This distribution of relevant data provides two avenues of outgoing calls.

The TCU/Modem utilizes a cellular connection 213 to transmit a voice, data or text to an emergency operator 215. The infotainment system uses a BLUETOOTH connection 209 to a user device, which also utilizes a cellular connection 211. In the illustrative embodiments, since both the modem and phone are capable of placing independent cellular calls, both systems can initiate or place a call at substantially the same time. In another example, if a WiFi calling/contact option is available, that option may be utilized in place of one of the calls or in addition to the calls, in response to the same accident indicator. By attempting to place two or more calls in response to detection of an accident, the process has a greater chance of completing a call, even if significant damage has been done to the vehicle or a connected cellular phone. Those of ordinary skill in the art will understand that concurrent or substantially simultaneous calls as described in this disclosure may be initiated at somewhat different times based on the processing of the signals that detect an accident and the particular communication options available, such as a vehicle modem and a connected or paired cellular telephone. It should also be appreciated that the redundant or concurrent calls are initiated in parallel or generally concurrently or simultaneously as opposed to sequentially or conditionally based on the outcome of a previous attempt or waiting for a signal that a particular attempt has failed prior to initiating a call using a different communication option.

Figure 3A:
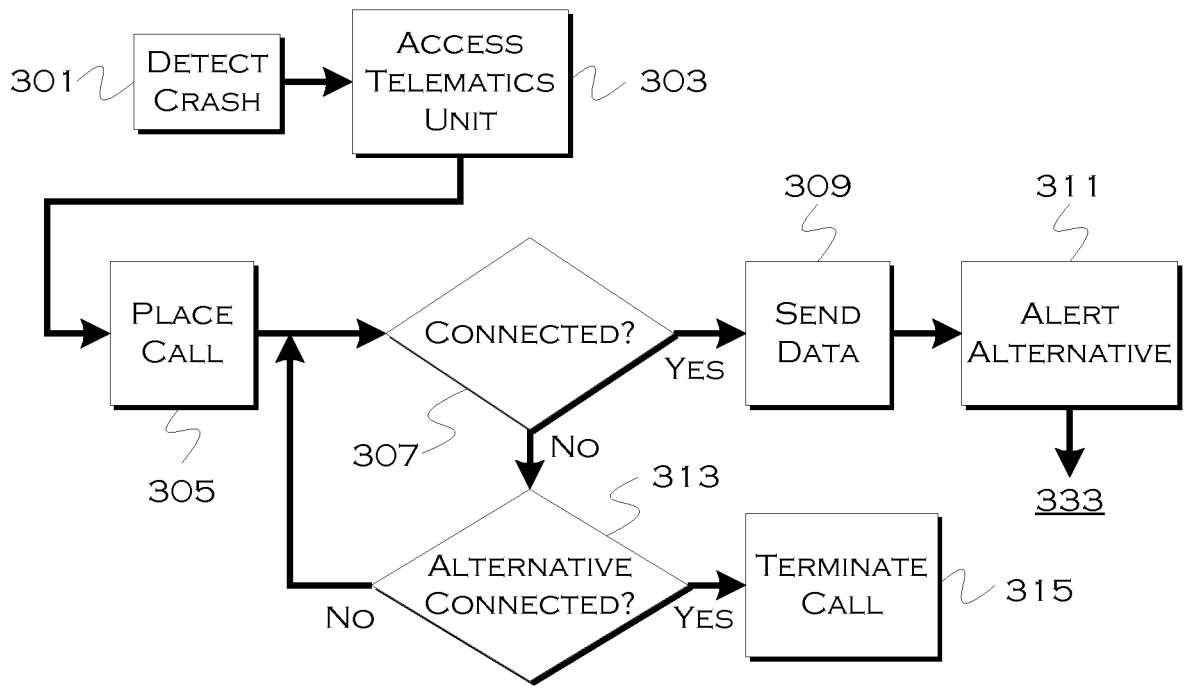
FIGS. 3A and 3B show illustrative processes for redundant call placement to emergency services.
Figure 3B:
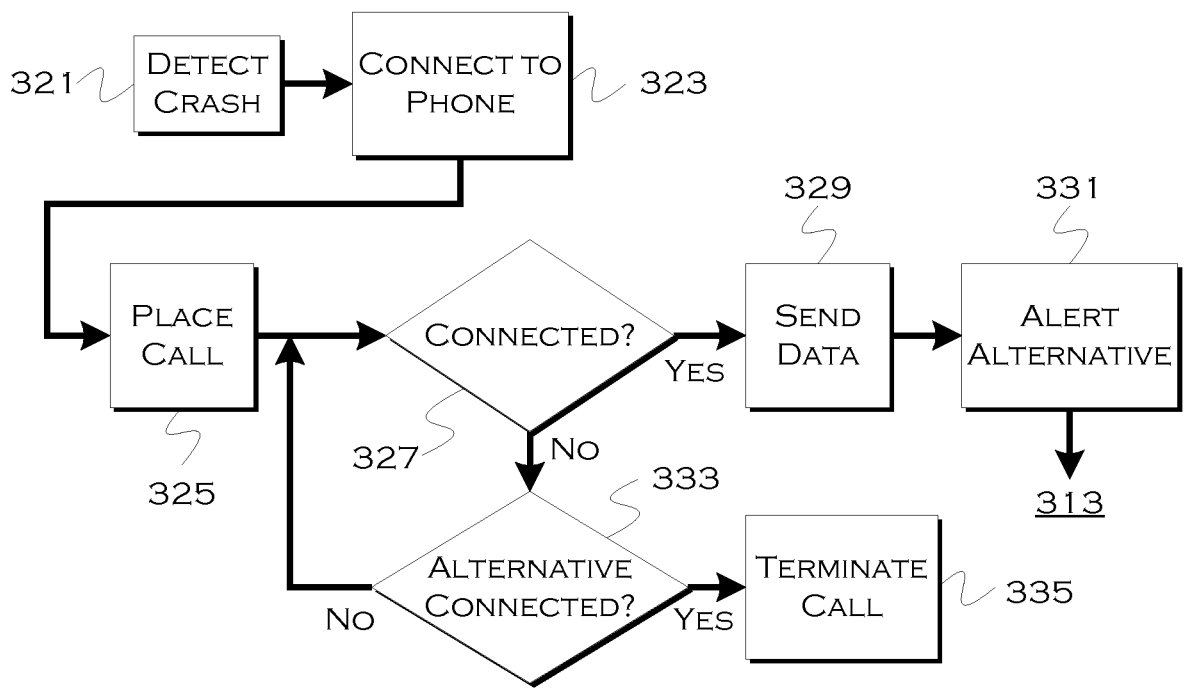

FIGS. 3A and 3B show illustrative processes for redundant call placements to emergency services. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the methods, the processor may be temporarily repurposed as a special purpose processor, until such time as the methods are completed. In another example, to the extent appropriate, firmware acting in accordance with a preconfigured processor may cause the processor to act as a special purpose processor provided for the purpose of performing the methods or some reasonable variations thereof.

In this illustrative example, processes for placing simultaneous calls from two (or more) different provided connections are demonstrated, and these processes are intended to run at the same time, so that more than one call can be placed if both systems are functioning properly. Termination of one of the multiple calls can result from damage to a call system, the vehicle computer placing the call determining that the call should be terminated, manual user termination of a call or, for example, the emergency operator terminating a redundant call. Since the operator may receive vehicle GPS coordinates with each call, the operator will know that two completed calls from the same vehicle both correspond to that vehicle. One of the two calls can be terminated, or, in an alternative solution, the operator can leave both calls open in case latent damage to one calling system causes a failure mid-call, and when one call is completed the other call may, for example, automatically terminate (or may be also terminated by the operator).

FIG. 3A shows an illustrative example of the process for placing the call through the telematics unit. As noted, this process will run in response to the same trigger or accident detection as the process shown in FIG. 3B when an accident is detected. In this process, the accident is detected using one or more sensors 301. The process gathers and sends relevant data to a vehicle telematics unit 303, instructing that a phone call be placed using a vehicle modem.

The call is attempted using the vehicle modem 305, and the attempt persists until the call is connected 307. In this example, while the call is being attempted, the process also monitors the other call(s) 313, to determine if an alternative connection has been established. In this example, if the alternative connection is established, the process terminates the call attempt through the telematics unit 315. In other examples, as noted, the call may still be attempted and/or placed until such time as the other call ends or the emergency operator terminates one or both calls.

Once the call is connected, the process sends the relevant emergency data 307 that was received from the CAN bus and other vehicle systems. Also, in this example, the process alerts the concurrently running process shown in FIG. 3B that the call has been placed and that some or all data has been sent 311.

FIG. 3B shows an example of the call placed using an occupant's paired phone. Again, the accident is detected using one or more vehicle sensors 321. This is the same sensing of the crash that caused the call to be placed through the telematics unit (e.g., a second set of sensors is not needed). This process uses the paired infotainment system to connect to the user's paired phone 323.

The connection is then used to place a call through the paired phone to the emergency operator 325. Again, until the call is connected 327, the process continues to try to connect. Also, in this example as well, the process can receive indicia from the process shown in FIG. 3A that the call placed through the telematics unit has been completed or connected 333 and can terminate the call attempt through the cellular phone 335. Also, as with the TCU connection/attempt, this process can continue to attempt the call until the emergency operator terminates the call or until the other call is completed.

Once the call is connected, the process sends the data to the emergency operator. This data will frequently include a vehicle identifier and/or a vehicle location, so the emergency operator, upon receiving the same data over two different calls, can elect to terminate one of the calls if desired, since it will be clear that multiple calls have come in from the same vehicle. And, as with the process shown in FIG. 3A, this process can alert the process placing the telematics control unit call, in case the telematics process is configured to terminate the telematics call in the event of the other call connecting or completing.

By allowing multiple calls to be placed and completed in response to the same trigger event rather than sequentially triggering different communication options, the probability of completing a call is increased. Furthermore, damage to a system can cause the call to fail mid-call, so having multiple calls placed provides a backup or redundant operation in the event that one call system fails.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a plurality of processors configured to:
utilize a plurality of vehicle connectivity options, each option in communication with one of the plurality of processors, to concurrently place a plurality of voice-calls to emergency services using the plurality of vehicle connectivity options in response to detection of a vehicle accident; and
terminate cellular call attempts when another of the plurality of processors indicates that a call placed by the another processor has connected.

2. The system of claim 1, wherein a first processor is configured to utilize a telematics control unit to place an emergency call over an embedded vehicle modem.

3. The system of claim 1, wherein a second processor is configured to utilize a BLUETOOTH connection with a paired occupant cellular phone to place an emergency call using the cellular phone.

4. The system of claim 1, wherein the processors are configured to send vehicle accident data over connections established as a result of the calls.

5. A computer-implemented method comprising:
detecting a vehicle accident;
placing a first emergency voice-call using a first vehicular communication option in response to detecting the accident;
placing a second concurrent emergency voice-call using a second vehicular communication option upon detecting the accident; and
terminating one of the first or second emergency calls when the other one of the first or second emergency calls has completed.

6. The method of claim 5, wherein the first vehicular communication option includes a telematics control unit in communication with an embedded vehicle modem over which the first emergency call can be placed.

7. The method of claim 5, wherein the second vehicular communication option includes an infotainment system paired with an occupant cellular phone over which the second emergency call can be placed.

8. The method of claim 5, further comprising sending vehicle accident data over connections established as a result of the calls.

9. A non-transitory computer readable storage medium, storing instructions that, when executed by a processor, cause the processor to perform a method comprising:
detecting a vehicle accident;
placing a first emergency voice-call using a first vehicular communication option upon detecting the vehicle accident;
concurrently placing a second emergency voice-call using a second vehicular communication option upon detecting the vehicle accident; and
terminating one of the first or second calls when the other of the first or second calls has connected.

* * * * *